US006691116B1

(12) United States Patent
Bart

(10) Patent No.: US 6,691,116 B1
(45) Date of Patent: Feb. 10, 2004

(54) METHOD AND SYSTEM FOR DATA COLLECTION FROM REMOTE SOURCES

(75) Inventor: Eric S. Bart, Boxford, MA (US)

(73) Assignee: Storability, Inc., Southborough, MA (US)

( * ) Notice: Subject to any disclaimer, the term of this patent is extended or adjusted under 35 U.S.C. 154(b) by 208 days.

(21) Appl. No.: 09/999,154

(22) Filed: Oct. 31, 2001

(51) Int. Cl.$^7$ ............................................... G06F 17/30
(52) U.S. Cl. ........................................ 707/10; 707/102
(58) Field of Search ......................... 707/10, 200, 205; 709/202, 213, 229, 246; 711/147; 713/168

(56) References Cited

U.S. PATENT DOCUMENTS

| | | | | |
|---|---|---|---|---|
| 5,608,874 A | * | 3/1997 | Ogawa et al. | 709/246 |
| 6,212,606 B1 | * | 4/2001 | Dimitroff | 711/147 |
| 6,421,723 B1 | * | 7/2002 | Tawil | 709/224 |

* cited by examiner

Primary Examiner—Diane D. Mizrahi
Assistant Examiner—Apu M Mofiz

(74) Attorney, Agent, or Firm—Hale and Dorr LLP

(57) ABSTRACT

In accordance with one embodiment, a system is provided for collecting data from diverse data sources at a remote site. The system includes data collection daemons at the remote site, each for retrieving data from one of the data sources and for translating the data into a common format. A remote query agent collects data in the common format from the data collection daemons, and aggregates the data in a serialized data stream. A central query agent at a central collection site receives the data stream from the remote query agent. A database aggregator initiates data retrieval by the data collection daemons and deposits data received from the central query agent into a collection database. In accordance with another embodiment, a method is provided for remote data collection from diverse data sources. The method includes receiving a request at a remote collection site for collecting data from the data sources in accordance with a predetermined schedule; retrieving the data from the data sources in response to receiving the request; translating retrieved data from each data source into a common format; aggregating the data in the common format into a serialized a data stream; and transmitting the data stream to a central collection site for storage in a collection database.

31 Claims, 2 Drawing Sheets

METHOD AND SYSTEM FOR DATA COLLECTION FROM REMOTE SOURCES

BACKGROUND OF THE INVENTION

1. Field of the Invention

The present invention relates generally to data collection and storage. More particularly, the invention relates to the collection and storage of data from multiple remote locations, and from diverse hardware and software platforms.

2. Description of Related Art

Computing infrastructures have become increasingly complex and difficult to manage. This is particularly true of large-scale storage area networks (SANs), which are often used with centralized storage. SANs are particularly complex because they include computers, networking infrastructure, and large storage arrays working in conjunction with one another in a diverse operational environment. These networks are typically assembled using components from different hardware vendors, each generally providing a separate and non-integrated software package used for management of the devices. Accordingly, management of these networks is particularly complex and difficult.

A need exists for a system that can actively manage data collection in SANs remotely, and with a high degree of automation. A need particularly exists for a distributed system that enables remote, secure data collection in a scaleable way from the diverse operational environments endemic to SANs.

BRIEF SUMMARY OF THE INVENTION

In accordance with one embodiment of the invention, a system is provided for collecting data from diverse data sources at a remote site. The system includes data collection daemons at the remote site, each for retrieving data from one of the data sources and for translating the data into a common format. A remote query agent collects data in the common format from the data collection daemons, and aggregates the data in a serialized data stream. A central query agent at a central collection site receives the data stream from the remote query agent over an encrypted communications link. A database aggregator initiates data retrieval by the data collection daemons in accordance with a predetermined schedule and deposits data received from the central query agent into a collection database.

In accordance with another embodiment of the invention, a method is provided for remote data collection from diverse data sources. The method includes receiving a request at a remote collection site for collecting data from the data sources in accordance with a predetermined schedule; retrieving the data from the data sources in response to receiving the request; translating retrieved data from each data source into a common format; aggregating the data in the common format into a serialized a data stream; and transmitting the data stream over a communications link to a central collection site for storage in a collection database.

The data collection method and system enable efficient, automated collection of data in the SAN environment. Data can be collected from a variety of data sources in many remote locations having disparate vendor hardware and software. The system is scaleable, secure, and vendor and application neutral.

These and other features of the present invention will become readily apparent from the following detailed description wherein embodiments of the invention are shown and described by way of illustration of the best mode of the invention. As will be realized, the invention is capable of other and different embodiments and its several details may be capable of modifications in various respects, all without departing from the invention. Accordingly, the drawings and description are to be regarded as illustrative in nature and not in a restrictive or limiting sense with the scope of the application being indicated in the claims.

BRIEF DESCRIPTION OF THE DRAWINGS

For a fuller understanding of the nature and objects of the present invention, reference should be made to the following detailed description taken in connection with the accompanying drawings wherein.

DETAILED DESCRIPTION OF PREFERRED EMBODIMENTS

The present invention is directed to a distributed data collection system that enables efficient, automated collection of data in the SAN environment. Data can be collected from a variety of data sources in many remote locations having disparate vendor hardware and software. The system is scaleable, secure, and vendor and application neutral.

Figure 1:
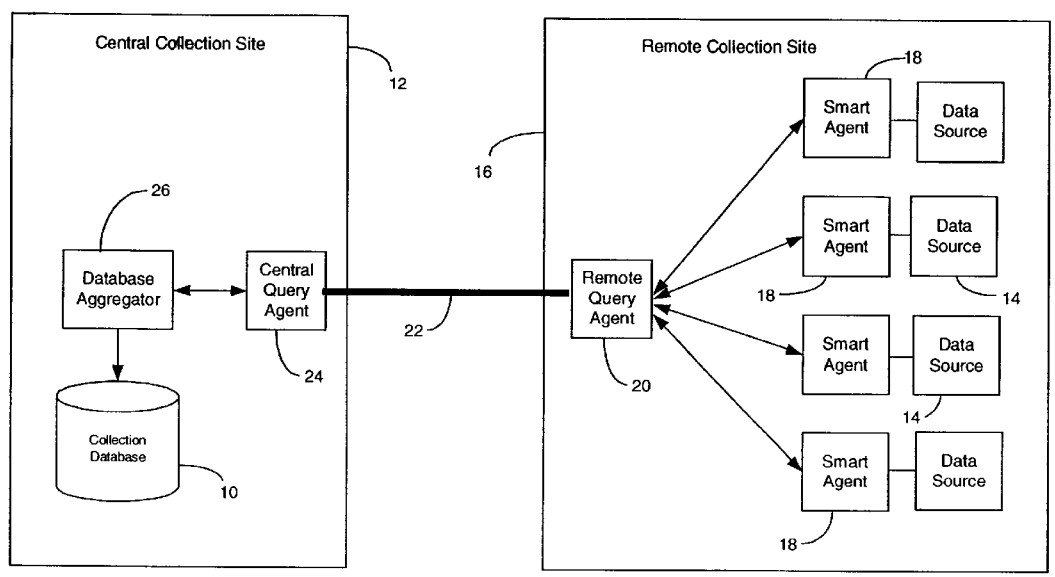
FIG. 1 is an architectural diagram illustrating a data collection system in accordance with one embodiment of the invention.

FIG. 1 is an architectural diagram of a basic data collection system in accordance with one embodiment of the invention. Data is collected in a collection database 10 at a central collection site 12 from multiple data sources 14 at a remote collection site 16. These data sources 14 can include, e.g., computer systems, storage arrays, fiber channel switches, tape archival units, databases and software applications. Data is retrieved from the data sources 14 by software daemons 18 described herein as "smart agents", which are installed on one or more computers at the remote collection site. Each smart agent 18 is associated with at least one of the data sources 14.

The smart agents 18 are preferably custom developed software applications designed to collect data from some particular vendor hardware and software application. They are stateless, and can translate vendor specific data representations to a vendor-neutral data representation or model, i.e., a common format. In this way, an agent 18 can be written for a specific vendor product of a certain type, say a storage array, and can provide data in an abstracted way that looks the same as the data provided from a competing vendor storage array. The system can thereby collect data in the central database 10 and utilize the data in a common way that spans vendor and application limitations. The data in the common format can advantageously be used for a variety of purposes including, e.g., reporting, trend analysis, change control, event monitoring, fault detection and identification and topology discovery.

The system also includes a software daemon 20 described herein as the "remote query agent", which is installed on a computer also at the remote site 16. The primary role of the remote query agent 20 is to concentrate or aggregate data streams sent from the various smart agents 18 at the remote site 16 into a single, serialized encrypted data stream. This encrypted data stream is then forwarded in a network independent byte ordered format upstream over a communications link 22 to the central collection site 12 for storage in the collection database 10. The communications link 22 between the remote and central sites can be, e.g., a dedicated, private link or some other link such as the Internet. The communications link 22 can comprise a high or low speed connection.

Figure 2:
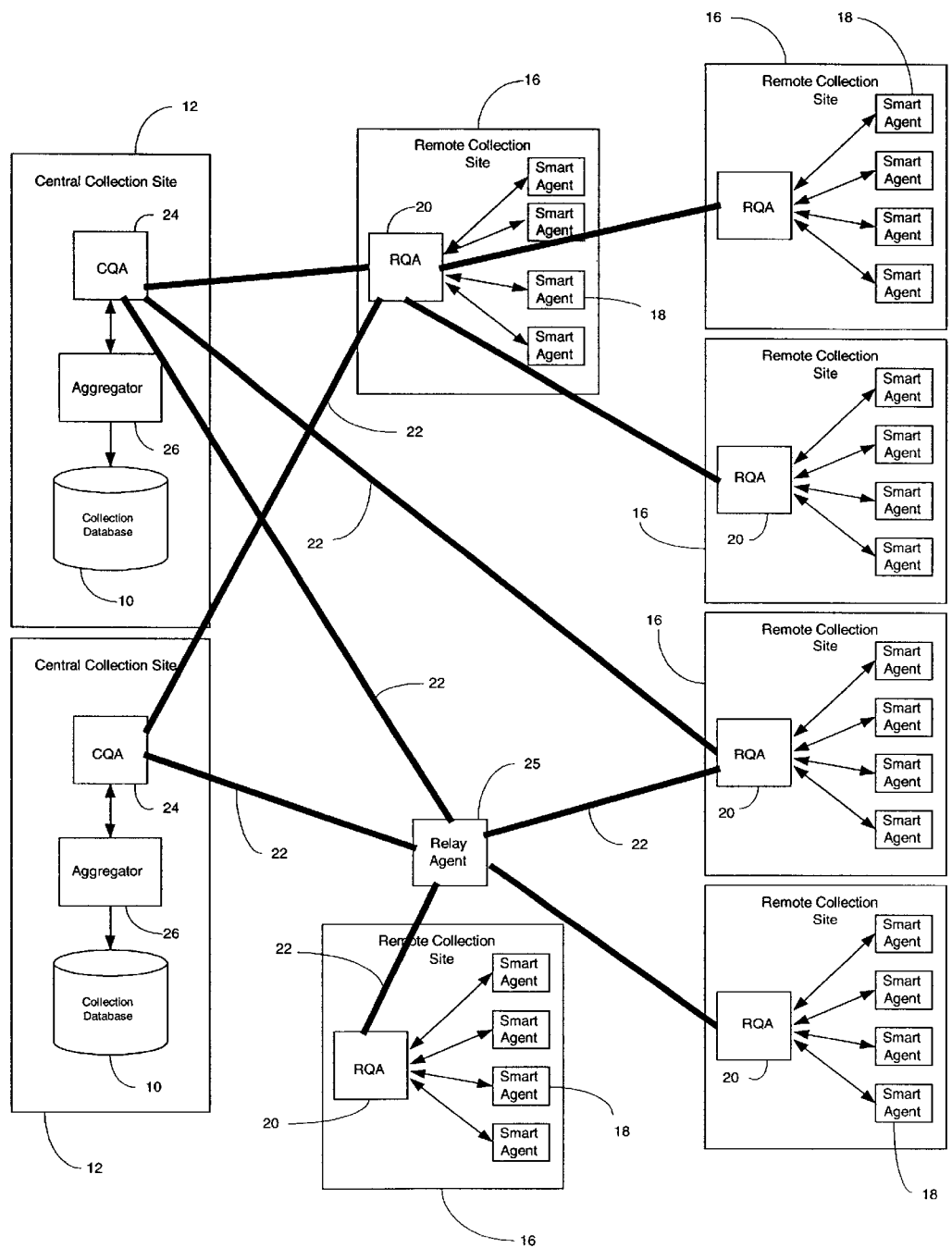
FIG. 2 is an architectural diagram illustrating a data collection system in accordance with another embodiment of the invention.

As shown in FIG. 2, the system is scalable and can collect data from multiple remote collection sites 16. (For ease of illustration, the data sources 14 are not shown in FIG. 2, but are understood to be present and associated with smart agents 18 as described previously.) The remote query agents 20 at the remote collection sites 16 send their data to the central query agent 24 via one or more layers or tiers of other remote query agents 20 and/or relay agents 25. The ability to have multiple tiers of remote query agents allows the architecture to scale to very large configurations.

The central query agent 24 is a daemon installed on a computer at the central collection site 12. If the system collects data from multiple remote query agents 20 (as shown, e.g., in FIG. 2), the central query agent 24 converges the encrypted data streams from the multiple remote query agents 20 into a single data stream. It then forwards the data stream to a database aggregator 26, which is another daemon installed on a computer at the central collection site 12. The database aggregator 26 receives the data stream and inserts the data contained therein into the database 10 in a common format, i.e., a vendor independent data model. This data model details how to abstract common traits from disparate vendor devices. By specifying an abstracted data model, common reports can be presented spanning different vendor devices.

The database aggregator 26 also acts as a scheduler. As a scheduler, the database aggregator 26 is responsible for initiating requests for data to be collected from data sources on scheduled, configurable basis. The database aggregator 26 has an initialization file that defines the schedule for each data stream for which it is responsible.

As shown in FIG. 2, the system can be scaled to support multiple redundant central collection sites 12 or data repositories, which can be located in geographically diverse locations. The smart agents 18 are stateless, and can provide data to multiple requesters. Additional redundant central collection 12 sites can be constructed without the need to modify any of the smart agents 18. Redundancy at the central database level can be accomplished by issuing redundant requests for the same data from multiple central processing systems.

An example dataflow for the FIG. 2 embodiment of the invention is as follows. A pre-scheduled alarm goes off in the process space of the database aggregator 26 in one of the central collection sites 12. In response, the database aggregator 26 sends a request for a given pre-scheduled data stream to the central query agent 24. The central query agent 24 then forwards the request to all known remote query agents 20. The remote query agents 20 forward the request either to other lower level remote query agents 20, or to the appropriate smart agents 18 at the remote location. The smart agents 18 retrieve the requested data to fulfill the request from their associated data sources, convert the data from the vendor or application specific format, and send the resultant data stream to their associated remote query agent 20. The smart agents 18 remain inactive until they receive a request to retrieve data and, accordingly, they consume little system resources.

The remote query agent 20 collects all resultant data streams from all appropriate smart agents 18, converges them into a single data stream, and forwards the data stream either to an upstream remote query agent 20 (or relay agent 25) or to the central query agent 24 over encrypted communications links.

The various software daemons and applications described above can be implemented in general purpose computers suitable of performing the described functions. A representative computer is a personal computer or a workstation platform that is, e.g., Intel Pentium, PowerPC or RISC based, and includes an operating system such as Windows, Solaris, Linux or the like.

Having described preferred embodiments of the present invention, it should be apparent that modifications can be made without departing from the spirit and scope of the invention.

What is claimed is:

1. A system for collecting data from diverse data sources at a remote site, comprising:

a plurality of data collection daemons at the remote site, each for retrieving data from one of the data sources and for translating the data into a common format;

a remote query agent for collecting data in the common format from the plurality of data collection daemons, and for aggregating the data in a serialized data stream;

a central query agent at a central collection site for receiving the data stream from the remote query agent;

a collection data base; and a database aggregator for initiating data retrieval by the data collection daemons and for depositing data received from the central query agent into the collection database.

2. The system of claim 1 wherein the database aggregator initiates data collection by the data collection daemons by transmitting requests to the data collection daemons in accordance with a predetermined schedule.

3. The system of claim 1 wherein the common format comprises a vendor neutral data representation.

4. The system of claim 1 wherein the remote query agent transmits data to the central query agent over an encrypted communications link.

5. The system of claim 1 wherein the remote query agent transmits data to the central query agent a serialized encrypted data stream.

6. The system of claim 1 wherein the remote query agent transmits the data stream to the central query agent via at least one intermediate query agent.

7. The system of claim 6 wherein the at least one intermediate query agent collects data from another plurality of data collection daemons at another remote data collection site.

8. The system of claim 1 further comprising a redundant collection site for independently collecting data from the plurality of data collection daemons, the redundant collection site including a second central query agent, a second database aggregator and a second collection database.

9. A method for remote data collection from diverse data sources, comprising:

receiving a request at a remote collection site for collecting data from the data sources in accordance with a predetermined schedule;

retrieving the data from the data sources in response to receiving the request;

translating retrieved data from each data source into a common format;

aggregating the data in the common format into a serialized a data stream; and transmitting the data stream to a central collection site for storage in a collection database.

10. The method of claim 9 wherein the common format comprises a vendor neutral data representation.

11. The method of claim 9 wherein the data stream is transmitted over an encrypted communications link.

12. The method of claim 9 wherein the data stream is transmitted to the central collection site via at least one intermediate query agent.

13. The method of claim 12 wherein the at least one intermediate query agent collects data from another plurality of data sources.

14. The method of claim 9 further comprising:
    receiving a request at the remote collection site from a redundant central collection site for collecting data from the data sources;
    retrieving the data from the data sources;
    translating retrieved data into a common format;
    aggregating the data in the common format into a serialized a data stream; and
    transmitting the data stream to the redundant central collection site for storage in a collection database.

15. A method for collecting data at a central collection site from diverse data sources at a remote site, comprising:
    generating a request at the central collection site for collecting data from the data sources at a remote collection site in accordance with a predetermined schedule;
    transmitting the request to data collection devices associated with the data sources at the remote site; and
    receiving data retrieved from the data sources, the data being translated into a common format and aggregated in a serialized data stream; and
    storing data from the data stream in the collection database at the central collection site.

16. The method of claim 15 wherein the common format comprises a vendor neutral data representation.

17. The method of claim 15 wherein the data stream is received over an encrypted communications link.

18. The method of claim 15 wherein the data stream is transmitted to the central collection site via at least one intermediate query agent.

19. The method of claim 18 wherein the at least one intermediate query agent collects data from a plurality of other data sources.

20. The method of claim 15, further comprising:
    generating a request at the central collection site for collecting data from data sources at another remote collection site in accordance with a predetermined schedule;
    transmitting the request to data collection devices associated with the data sources at the another remote site; and
    receiving data retrieved from the data sources at the another remote site, the data being translated into a common format and aggregated in a serialized data stream; and
    storing data from the data stream in the collection database at the central collection site.

21. A system for collecting data from diverse data sources at a plurality of remote sites, comprising:
    a plurality of data collection daemons at each remote site, each data collection daemon for retrieving data from one of the data sources an d for translating the data into a common format;
    a remote query agent at each remote site for collecting data in the common format from the plurality of data collection daemons at the remote site, and for aggregating the data in a serialized data stream;
    a central query agent at a central collection site for receiving the serialized data streams from the remote query agents at each remote site, and for aggregating the serialized data streams into a single data stream;
    a collection data base; and
    a database aggregator for initiating data retrieval by the data collection daemons and for depositing data received from the central query agent into the collection database.

22. The system of claim 21 wherein the database aggregator initiates data collection by the data collection daemons by transmitting requests to the data collection daemons in accordance with a predetermined schedule.

23. The system of claim 21 wherein the common format comprises a vendor neutral data representation.

24. The system of claim 21 wherein the remote query agent at each remote site transmits data to the central query agent over an encrypted communications link.

25. The system of claim 21 wherein at least some of the remote query agents transmit a data stream to the central query agent via at least one intermediate query agent.

26. The system of claim 25 wherein the at least one intermediate query agent collects data from another plurality of data collection daemons at another remote site.

27. The system of claim 21 further comprising a redundant collection site for independently collecting data from the plurality of data collection daemons, the redundant collection site including a second central query agent, a second database aggregator and a second collection database.

28. A system for remote data collection from diverse data sources, comprising:
    means for receiving a request at a remote collection site for collecting data from the data sources in accordance with a predetermined schedule;
    means for retrieving the data from the data sources;
    means for translating retrieved data from each data source into a common format;
    means for aggregating the data in the common format into a serialized a data stream; and
    means for transmitting the data stream to a central collection site for storage in a collection database.

29. The system of claim 28 wherein the common format comprises a vendor neutral data representation.

30. A system for collecting data at a central collection site from diverse data sources at a remote site, comprising:
    means for generating a request at the central collection site for collecting data from the data sources at a remote collection site in accordance with a predetermined schedule;
    means for transmitting the request to data collection devices associated with the data sources at the remote site; and
    means for receiving data retrieved from the data sources, the data being translated into a common format and aggregated in a serialized data stream; and
    means for storing data from the data stream in the collection database at the central collection site.

31. The system of claim 30 wherein the common format comprises a vendor neutral data representation.

* * * * *